US010395681B1

(12) United States Patent
Breuer et al.

(10) Patent No.: US 10,395,681 B1
(45) Date of Patent: Aug. 27, 2019

(54) ADJUSTABLE MAGNETIC TAPE DRIVE

(71) Applicant: International Business Machines Corporation, Armonk, NY (US)

(72) Inventors: Marcus Breuer, Dalheim (DE); Frank Krick, Ockenheim (DE); Juergen Beck, Stadecken-Elsheim (DE); Bernd Freitag, Partenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/141,062

(22) Filed: Sep. 25, 2018

(51) Int. Cl.
  *G11B 15/18* (2006.01)
  *G11B 5/48* (2006.01)
  *G11B 5/008* (2006.01)
  *G11B 5/588* (2006.01)

(52) U.S. Cl.
  CPC ........ *G11B 5/4893* (2013.01); *G11B 5/00813* (2013.01)

(58) Field of Classification Search
  CPC ........... G11B 5/588; G11B 5/584; G11B 5/56; G11B 15/43; G11B 15/38; G11B 15/32; G11B 11/06
  USPC ............... 360/73.04, 75, 77.01, 77.12, 78.02
  See application file for complete search history.

(56) References Cited

U.S. PATENT DOCUMENTS

| 3,564,158 A | 2/1971 | Horton |
| 7,325,763 B1 | 2/2008 | Argumedo et al. |
| 7,609,475 B2 | 10/2009 | Biskebom et al. |
| 8,743,508 B2 | 6/2014 | Argumedo et al. |
| 9,218,839 B2 * | 12/2015 | Cherubini .............. G11B 5/584 |
| 9,484,056 B2 | 11/2016 | Biskebom et al. |
| 9,564,161 B1 | 2/2017 | Cherubini et al. |
| 2007/0285840 A1 | 12/2007 | Kitamura |
| 2015/0364154 A1 | 12/2015 | Holmberg et al. |
| 2016/0189738 A1 | 6/2016 | Lakshmikumaran et al. |

FOREIGN PATENT DOCUMENTS

| CA | 1061459 A1 | 8/1979 |
| EP | 0212925 B1 | 7/1989 |

OTHER PUBLICATIONS

Raeymaekers et al., "Enhancing tribological performance of the magnetic tape/guide interface by laser surface texturing," Tribology Letters, 2007, 7 pages, Copyright 2007 Springer Science+Business Media LLC.

* cited by examiner

*Primary Examiner* — Nabil Z Hindi
(74) *Attorney, Agent, or Firm* — Jamar K. Ray (57) ABSTRACT

A media device may comprise a controller, a tape head, a tape comprising tape-position indicia, an indicia detection device, and an adjusting device. The indicia detection device may be configured to detect the tape-position indicia and provide an output corresponding to a tape position. The controller may be configured to send an adjustment command based on the output. The adjusting device may be configured to adjust the media device between a first configuration and a second configuration, based on the adjustment command. The tape may physically contact the tape head in the first configuration and not physically contact the tape head in the second configuration.

20 Claims, 7 Drawing Sheets

ADJUSTABLE MAGNETIC TAPE DRIVE

BACKGROUND

The present disclosure relates to media devices, and more specifically, to magnetic tape drives.

Magnetic tape drives are used for data storage. Magnetic tape drives read and write data to a magnetic tape by moving the magnetic tape across a tape drive head. The tape drive head typically maintains physical contact with the magnetic tape as the magnetic tape moves.

SUMMARY

Some embodiments of the present disclosure can be illustrated as a media device comprising a controller. The media device may also comprise a tape head. The media device may also comprise a tape. The tape may further comprise tape-position indicia. The media device may also comprise an indicia detection device. The media device may also comprise an adjusting device. The indicia detection device may be configured to detect the tape-position indicia. The indicia detection device may be further configured to provide an output corresponding to a tape position. The controller may be configured to send an adjustment command. The adjustment command may be based on the output. The adjusting device may be configured to adjust the media device between a first configuration and a second configuration. The adjusting may be based on the adjustment command. The tape may physically contact the tape head in the first configuration. The tape may not physically contact the tape head in the second configuration.

Some embodiments of the present disclosure can be illustrated as a method for adjusting a media device. The method may comprise detecting a tape-position indicium of a media device tape. The method may also comprise, in response to the detecting, determining a present longitudinal position along the length of the tape. The method may also comprise adjusting the media device between a first configuration and a second configuration. The method may further comprise the tape physically contacting a tape head of the media device in the first configuration. The method may further comprise a contact force between the tape and the tape head being reduced in the second configuration. The method may also comprise spooling the tape. The method may also comprise stopping the spooling. The stopping the spooling may be based on determining that a target position has been reached. The method may also comprise returning the media device to the first configuration from the second configuration.

Some embodiments of the present disclosure can be illustrated as a computer program product for adjusting a media device, the computer program product comprising a computer readable storage medium having program instructions embodied therewith, the program instructions executable by a computer to cause the computer to perform the aforementioned method for adjusting a media device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to magnetic tape drives, more particular aspects relate to decreasing wear within magnetic tape drives by reducing frictional contact between their internal components. While the present disclosure is not necessarily limited to such applications, various aspects of the disclosure may be appreciated through a discussion of various examples using this context.

Magnetic tape drives are media devices capable of storing large quantities of data on a tape. In linear tape drives, data is stored in at least one track that runs longitudinally along the length of the tape. Thus, each time a host computer seeks to read from and/or write to the tape, the tape drive must advance, or spool, the tape in a longitudinal direction until a tape drive head ("head") inside the tape drive contacts a target position. The target position is the position of the tape where the head reads and/or writes data. Furthermore, as the tape is spooled, it rubs against the head as it slides over the head. The sliding motion of the tape can cause significant friction between the tape and the head. Such friction can abrade portions of the head, cause grooves to develop on portions of the head, and damage the tape, all of which can adversely affect the performance of the tape drive. To address this problem, embodiments of the present invention adjust the relative position of the tape and the head to reduce the friction between the tape and the head.

Tape drives "access," a tape when they read and/or write to the tape. During such accessing, the tape makes physical contact with the head as it slides across the head. During a writing operation, the tape head magnetizes particles in the tape to form magnetic field patterns that correspond to digital information being stored on the tape. A track is the longitudinal row of such magnetic field patterns, and multiple parallel tracks may be written to a tape. After a track has been written, the head may perform a reading operation, during which the head detects the magnetic field patterns in the tape and those patterns are converted into the digital information that was written to the tape.

Spooling is the process of moving the tape such that a target position of the tape is put into contact with the head and can be accessed by the tape drive. Prior to spooling, the target position is located a distance from the position of the tape that currently contacts the head (sometimes referred to herein as the "present longitudinal position"). For example, a present longitudinal position of the tape that contacts the head may be 2 meters along the tape from a first end of the tape, and a target position may be 10 meters along the tape from the first end of the tape. To reach the target position, tape reels inside the tape drive must move the tape until the head makes physical contact with the target position.

Physical contact between the tape and the head is typically maintained while accessing the tape and while spooling the tape. A tape may move at a rate of approximately 3 meters per second when it is accessed and approximately 9 meters per second when it is spooled. Since spooling can place longer lengths of tape into frictional contact with the head over shorter periods of time than accessing, frictional wear between the tape and the head may occur much more rapidly while the tape is spooled.

In tape drives, the tape generally moves across the head along a longitudinal X-axis, and the head may contact the tape along a perpendicular axis, or along a vertical Y-axis (i.e., the direction corresponding to the thickness of the tape). In some instances, the head may move in a transverse direction, or along a Z-axis that is perpendicular to the X and Y axes. As discussed below, the head may include at least one actuator that permits its movement along the Z-axis so that the head may maintain proper alignment with the tape when the tape is accessed.

The head may include components, such as data write and read elements and servo read elements. The data write and read elements perform the writing and reading operations discussed above. The servo read elements may aid in keeping the head properly aligned with the tape by reading servo bands prerecorded on the tape. The servo bands may provide information, such as a longitudinal position, or "LPOS," along the length of the tape and a transverse position of the head relative to the tape.

Additional components that may be operably connected to the head to maintain proper alignment with the tape include at least one transducer, at least one signal processing unit, at least one controller, and at least one actuator. The transducer and signal processing unit may obtain and process position information from the tape and communicate it to the controller. Based on the communicated information, the controller may determine parameters such as tape velocity, longitudinal tape position, and transverse tape head position, and use those parameters to command the at least one actuator to reposition the head. Such actuators may displace the head in a transverse direction or tilt the head at an angle to maintain proper alignment with the tape.

The continuous contact between the tape and the head in tape drives causes frictional wear that can degrade the surfaces of the head and the tape. Such degradation can reduce the accuracy and the operational life of the tape drive.

Embodiments of the present invention can reduce the frictional wear between the head and the tape by reducing the amount of physical contact between the head and the tape. Such reduced physical contact is accomplished by adjusting the relative position of the head and the tape while the tape is spooled. In some embodiments, the tape can be displaced away from the head to reduce physical contact between the head and the tape, and in other embodiments, the head can be displaced away from the tape to reduce physical contact between the head and the tape. Embodiments of the present invention may also permit the tape to be spooled at higher than typical speeds, since the risk of damage from frictional wear is reduced.

Embodiments of the present invention also account for a need to determine a longitudinal position of the tape while the tape is spooled with reduced physical contact between the tape and the head. For example, embodiments of the present invention can determine a longitudinal position of the tape as the tape is spooled with no physical contact between the tape and the head. In some embodiments, a longitudinal position of the tape can be determined by a spooling time and a predetermined rotating speed. In other embodiments, a longitudinal position of the tape can be determined by detecting indicia on the tape with a detection device. As a result, embodiments of the present invention can improve the accuracy and increase the operational life of the tape drive by reducing wear between the head and the tape.

Figure 1A:
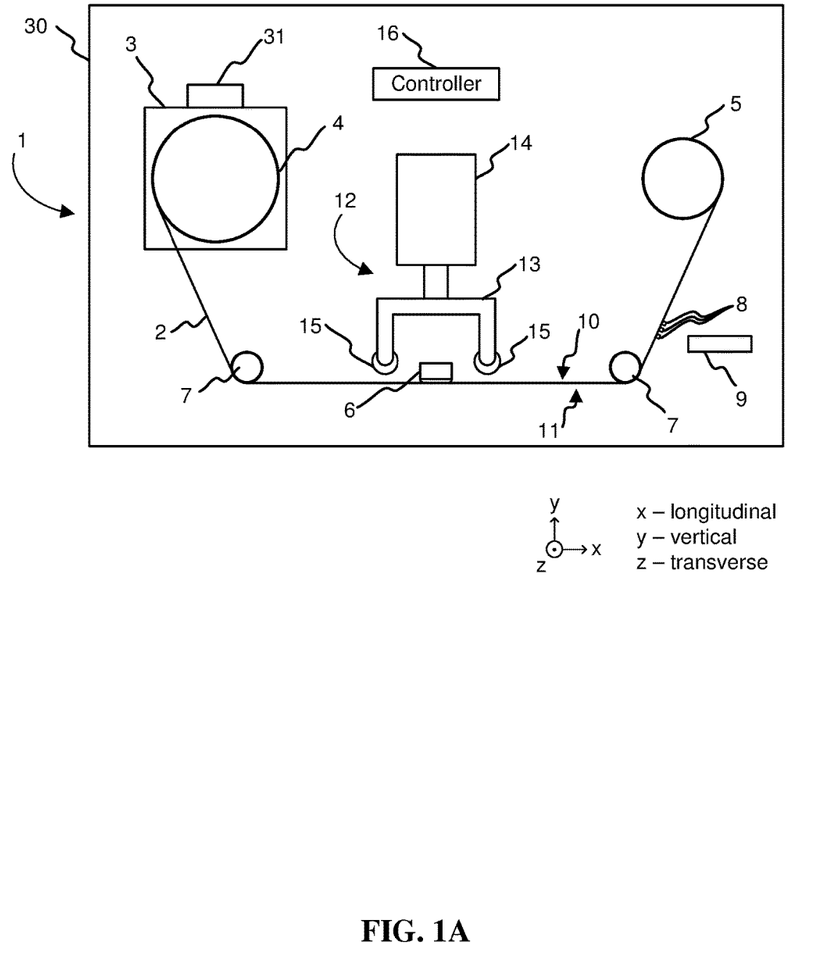
FIG. 1A depicts an adjustable magnetic tape drive, in accordance with embodiments.
Figure 1B:
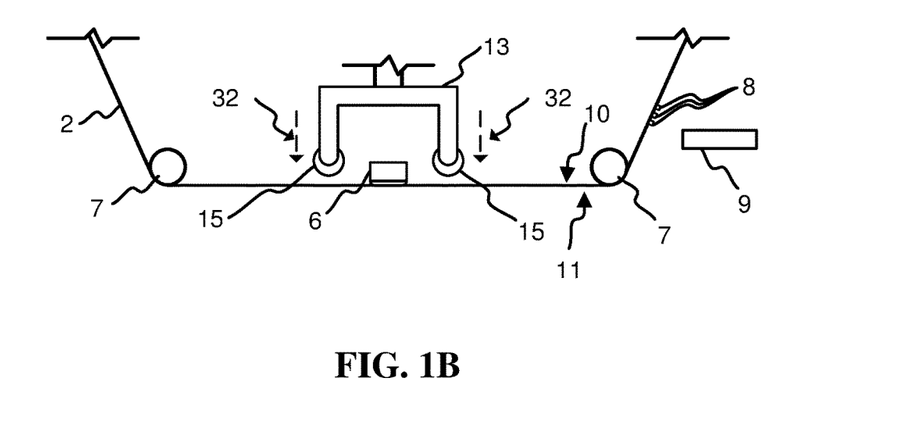
FIG. 1B depicts the adjusting arm of the magnetic tape drive of FIG. 1A in a first position, in accordance with embodiments.
Figure 1C:
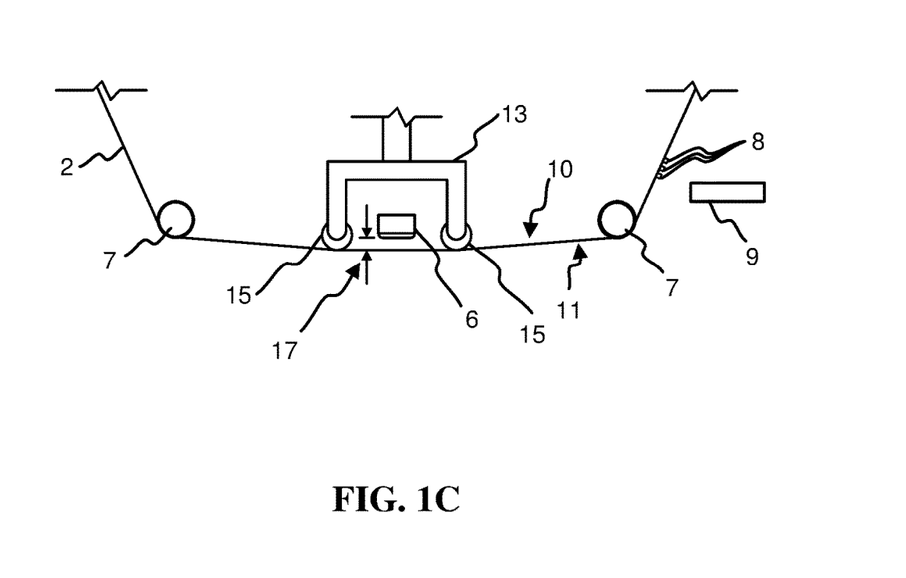
FIG. 1C depicts the adjusting arm of the magnetic tape drive of FIG. 1A in a second position, in accordance with embodiments.

FIGS. 1A-1C illustrate a tape drive 1 according to an embodiment of the present invention. The tape drive embodiment shown in FIG. 1A includes a first reel 4 and a second reel 5 within a tape drive frame 30. Each reel may be rotatable in a clockwise and a counterclockwise direction by at least one tape reel motor 31. Depending on which direction the tape 2 is moving across the head 6, one reel supplies the tape and the other reel takes up the tape. The tape 2 passes over one or more guides 7 that direct the tape 2 along a path across the head 6 and between the reels 4,5. Although FIG. 1A shows the tape 2 provided in a single-reel cartridge 3, the present invention is applicable to a variety of tape configurations, such as dual-reel cartridges and magnetic tapes on open reels.

In the illustrated embodiment, the tape 2 includes tape-position indicia 8 along the length of the tape 2. The tape-position indicia 8 provide data regarding longitudinal positions along the length of the tape 2. The tape-position indicia 8 may be included in various forms, such as optically detectable patterns or detectable magnetic field patterns. For example, the tape-position indicia 8 may be barcodes, colored indicators, or magnetic servo bands. Additionally, the tape-position indicia 8 may be included on one or more surfaces of the tape 2 or within the tape 2 or on one or more surfaces of the tape and within the tape 2.

The tape-position indicia are detectable by at least one indicia detection device 9. The indicia detection device 9 can detect a tape-position indicium and transmit a corresponding output that represents a longitudinal position along the length of the tape 2. Such output may be provided in a variety of forms, such as a binary code or a file. The output may be utilized to determine a longitudinal position of the tape 2.

The indicia detection device 9 may be one of a variety of detectors, such as an optical detector or a magnetic-field detector. For example, in some embodiments, the indicia detection device 9 may be a bar code scanner used to detect a barcode tape-position indicium and provide an output that represents a longitudinal position that is 15 meters along the tape from a first end of the tape.

The indicia detection device 9 may be included in various locations relative to the tape 2, such as on a proximal side 10 of the tape 2 that contacts the head 6 or on a distal side 11 of the tape 2 that does not contact the head 6. The indicia detection device may be the head, integrated into the head, or integrated into an adjusting device 12. Alternatively, the indicia detection device 9 may be a discrete device within the tape drive 1. Finally, the tape drive 1 may include a plurality of indicia detection devices.

The tape drive further includes an adjusting device 12 that adjusts the relative position of the tape 2 and the head 6. The adjusting device 12 includes an adjusting arm 13 attached to an actuator 14. The actuator 14 may be one of a variety of actuators, such as an electro-mechanical linear actuator or a linear motor. In the embodiment shown in FIG. 1A, the adjusting device 12 comprises a dual-contact adjusting arm 13 attached to an actuator 14 that can displace the adjusting arm 13 along a vertical Y-axis. Furthermore, the adjusting arm 13, as illustrated in the embodiment in FIG. 1A, includes contacts 15 that can be placed in contact with the tape 2 to displace the tape 2. Each contact 15 may include a surface that engages in rolling contact, sliding contact, or rolling and sliding contact with the tape 2. The adjusting device 12 may be provided in a variety of alternate configurations, such as including an adjusting arm that contacts the tape 2 in more locations or fewer locations than the embodiment shown in FIG. 1A.

Finally, the tape drive includes a controller 16 that can send and receive signals from the adjusting device 12, the indicia detection device 9, the tape reel motor 31, and the head 6. In some embodiments, the controller may be a component of the adjusting device, the indicia detection device, or the motor. Furthermore, the controller may be placed in one of a variety of positions inside or outside of the tape drive.

FIGS. 1B and 1C show the adjusting arm 13 of FIG. 1A in first and second positions, respectively. The first position shown in FIG. 1B corresponds to the first configuration of the tape drive 1 in which the head 6 is in contact with the tape 2 for accessing the tape. As indicated by arrows 32, the adjusting arm 13 in FIG. 1B can be displaced downward along a vertical Y-axis into a second position for spooling the tape.

FIG. 1C shows the adjusting arm 13 in the second position, which corresponds to the second configuration of the tape drive 1. When the tape drive is in the second configuration, the physical contact between the head 6 and the tape 2 is reduced for spooling (i.e. the magnitude of the contact force between the head and the tape is lower in the second configuration than it is in the first configuration). In the second position of the adjusting arm, shown in FIG. 1C, the adjusting arm 13 displaces the tape 2 to a predetermined distance 17 from the head 6, such that there is no physical contact between the head 6 and the tape 2. After the tape 2 has been spooled, the adjusting arm 13 may be returned to the first position.

In some embodiments it may be beneficial to include the tape-position indicia or at least one indicia detection device on the same side of the tape that contacts the head. For example, in some instances it may be less expensive to manufacture a tape with all indicators (e.g., magnetic field patterns, optically detectable marks) on the same side. In other instances, space considerations inside the tape drive may foreclose including an indicia detection device on the opposite side of the tape. Such an embodiment is illustrated in FIGS. 2A and 2B.

Figure 2A:
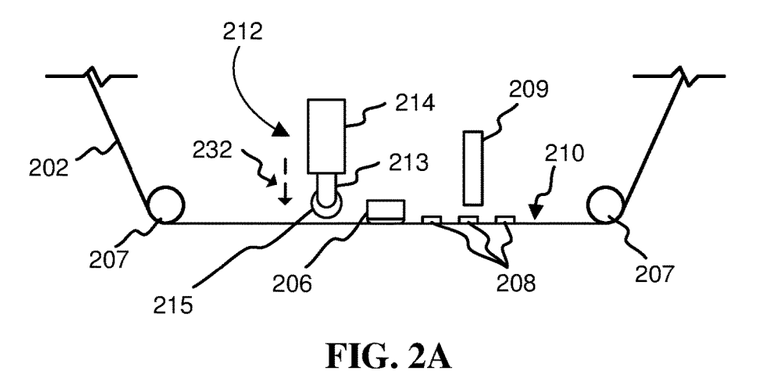
FIG. 2A depicts an adjusting device having a single-contact adjusting arm in a first position, in accordance with embodiments.
Figure 2B:
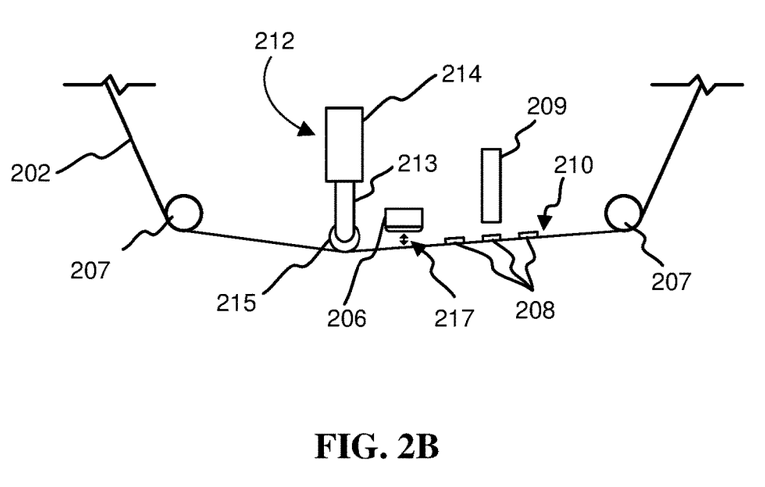
FIG. 2B depicts the adjusting device of FIG. 2A with the adjusting arm in a second position, in accordance with embodiments.

In FIGS. 2A and 2B, tape-position indicia 208 are included on a proximal side 210 of tape 202. Additionally, in the embodiment of FIGS. 2A and 2B, the indicia detection device 209 is included on the proximal side 210 of the tape 202, where it can detect the tape-position indicia 208. For example, the tape-position indicia 208 may be colored indicators along the periphery of the tape 202 that indicate longitudinal distances along the tape and are detectable by an optical indicia detection device 209.

FIG. 2A shows an adjusting device 212 with an adjusting arm 213 in a first position which corresponds to a first configuration of a tape drive. In the first configuration, the head 206 is in contact with the tape 202 for accessing the tape. Furthermore, the adjusting device 212 comprises a single-contact adjusting arm 213, as the adjusting device 212 includes a single contact 215 for contacting the tape 202. Contact 215 may include a surface that engages in rolling contact, sliding contact, or rolling and sliding contact with the tape 202. As indicated by arrow 232, the adjusting arm 213 in FIG. 2A can be displaced downward along a vertical Y-axis into a second position for spooling the tape.

FIG. 2B shows the adjusting arm 213 in the second position, which corresponds to the second configuration of the tape drive. When the tape drive is in the second configuration, the physical contact between the head 206 and the tape 202 is reduced for spooling (i.e. the magnitude of the contact force between the head and the tape is lower in the second configuration than it is in the first configuration). In the second position of the adjusting arm 213 shown in FIG. 2B, the adjusting arm 213 displaces the tape 202 to a predetermined distance 217 from the head, such that there is no physical contact between the head 206 and the tape 202. After the tape 202 has been spooled, the adjusting arm 213 may be returned to the first position.

Figure 3A:
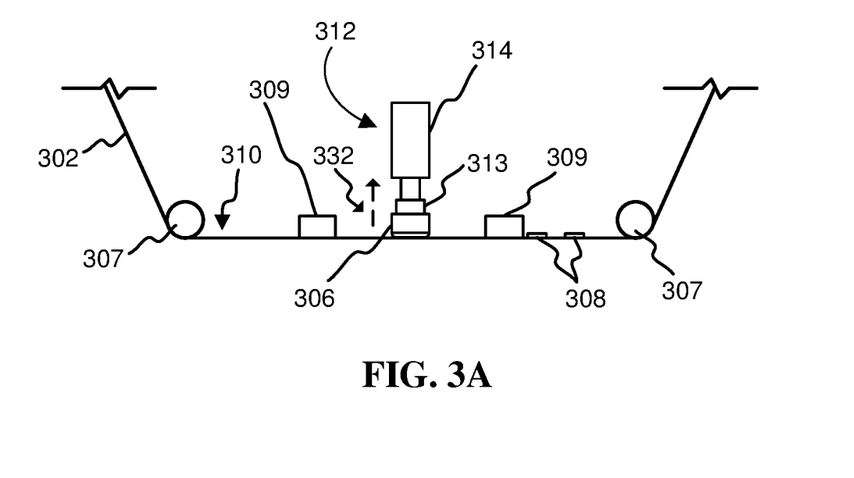
FIG. 3A depicts an adjusting device attached to a head and with an adjusting arm in a first position, in accordance with embodiments.
Figure 3B:
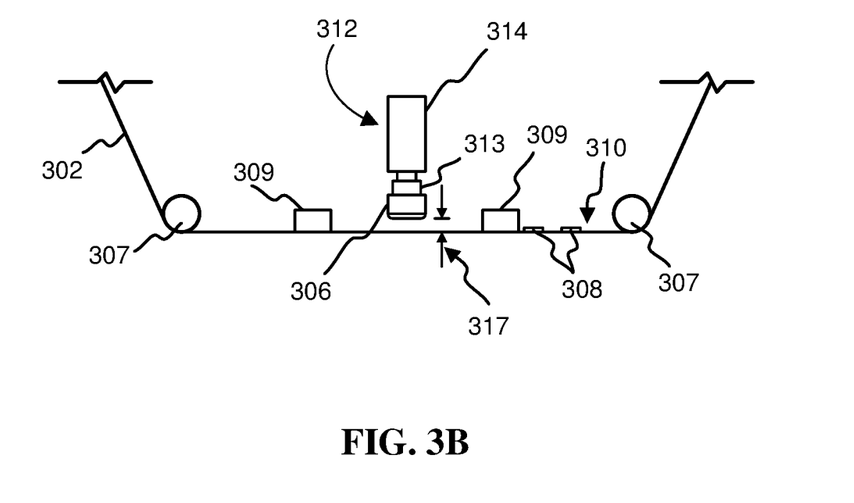
FIG. 3B depicts the adjusting device of FIG. 3A with the adjusting arm in a second position, in accordance with embodiments.

FIGS. 3A and 3B illustrate first and second configurations of an alternate embodiment of the present invention. The embodiment shown in FIG. 3A shows an adjusting device 312 in a first position which corresponds to a first configuration of a tape drive. In the first configuration, the head 306 is in contact with the tape 302 for accessing the tape. Furthermore, in the embodiment of FIGS. 3A and 3B, the adjusting device 312 is attached to the head 306. Thus, instead of displacing the tape 302 away from the head, as in the embodiments discussed above, the adjusting device 312 shown in FIGS. 3A and 3B can displace the head 306 away from the tape 302. As indicated by arrow 332, the adjusting arm 313 in FIG. 3A can be displaced upward along a vertical Y-axis into a second position for spooling the tape.

The embodiment shown in FIG. 3A further includes two indicia detection devices 309 on the proximal side 310 of the tape 302, where they can detect tape-position-indicia 308 on the side 310 of the tape 302 that contacts the head 306. For example, the indicia detection devices 309 may be a pair of magnetic field sensors used to detect magnetic field patterns written to the tape 302. Such magnetic field patterns may provide longitudinal distance data to the indicia detection devices 309. Furthermore, the two indicia detection devices 309 may be included to provide redundancy, such that if one indicia detection device fails to detect the tape-position indicia 308, another indicia detection device will be available to perform the detection.

FIG. 3B shows the adjusting arm 313 in a second position, which corresponds to the second configuration of the tape drive. When the tape drive is in the second configuration, the physical contact between the head 306 and the tape 302 is reduced for spooling (i.e. the magnitude of the contact force between the head and the tape is lower in the second configuration than it is in the first configuration). In the second position of the adjusting arm 313 shown in FIG. 3B, the adjusting arm 313 displaces the head 306 a predetermined distance 317 upward, such that the contact force between the head 306 and the tape 302 is reduced. Although FIG. 3B shows a physical gap between the head 306 and the tape 302, in some embodiments, the head 306 and the tape 302 may maintain physical contact, but with a reduced contact force. Such a configuration might accomplish reduced frictional contact while requiring less time to adjust the tape drive than embodiments in which no contact occurs between the head and the tape during spooling. After the tape 302 has been spooled, the adjusting arm 313 may be returned to the first position.

Figure 4:
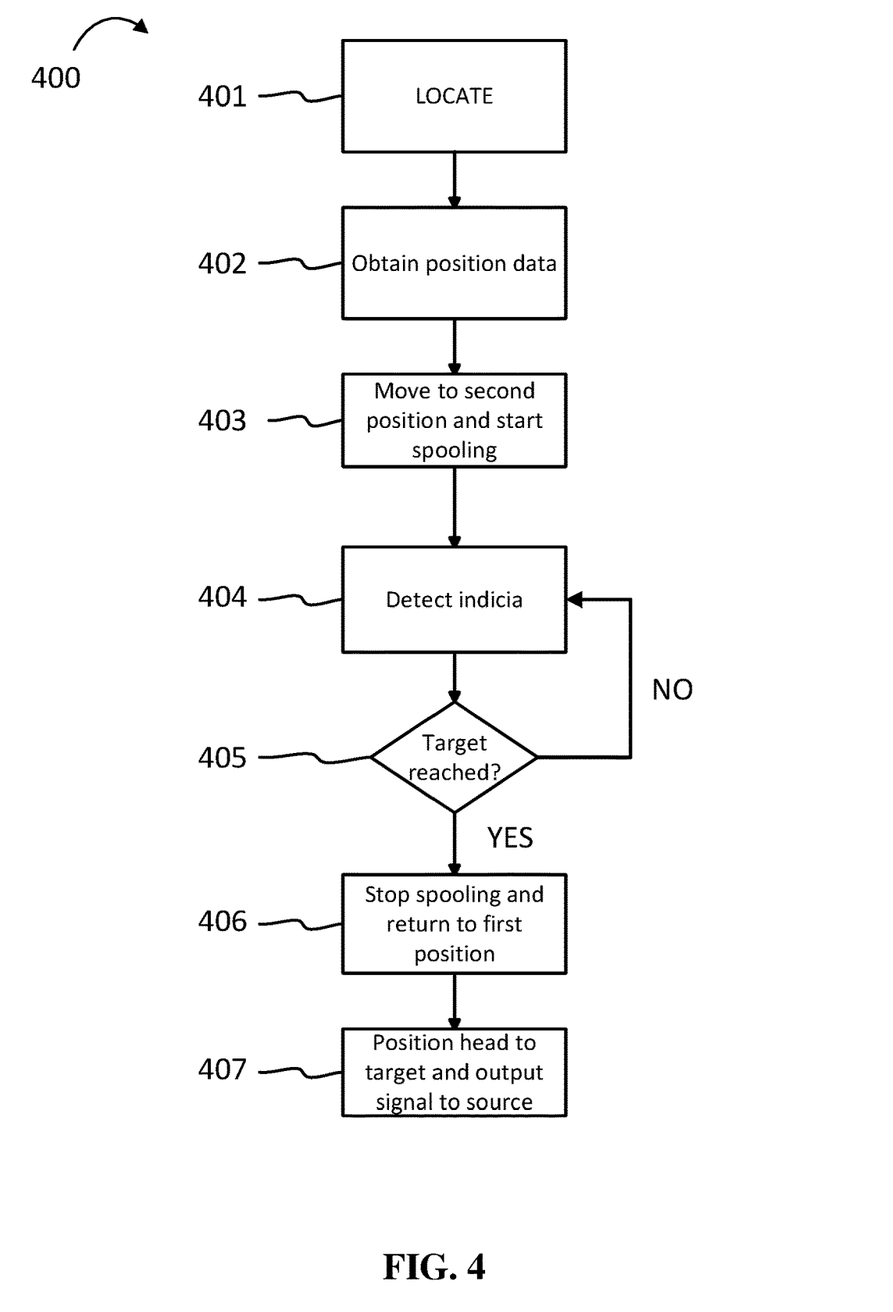
FIG. 4 depicts an absolute position method of adjusting a tape drive, in accordance with embodiments.
Figure 5:
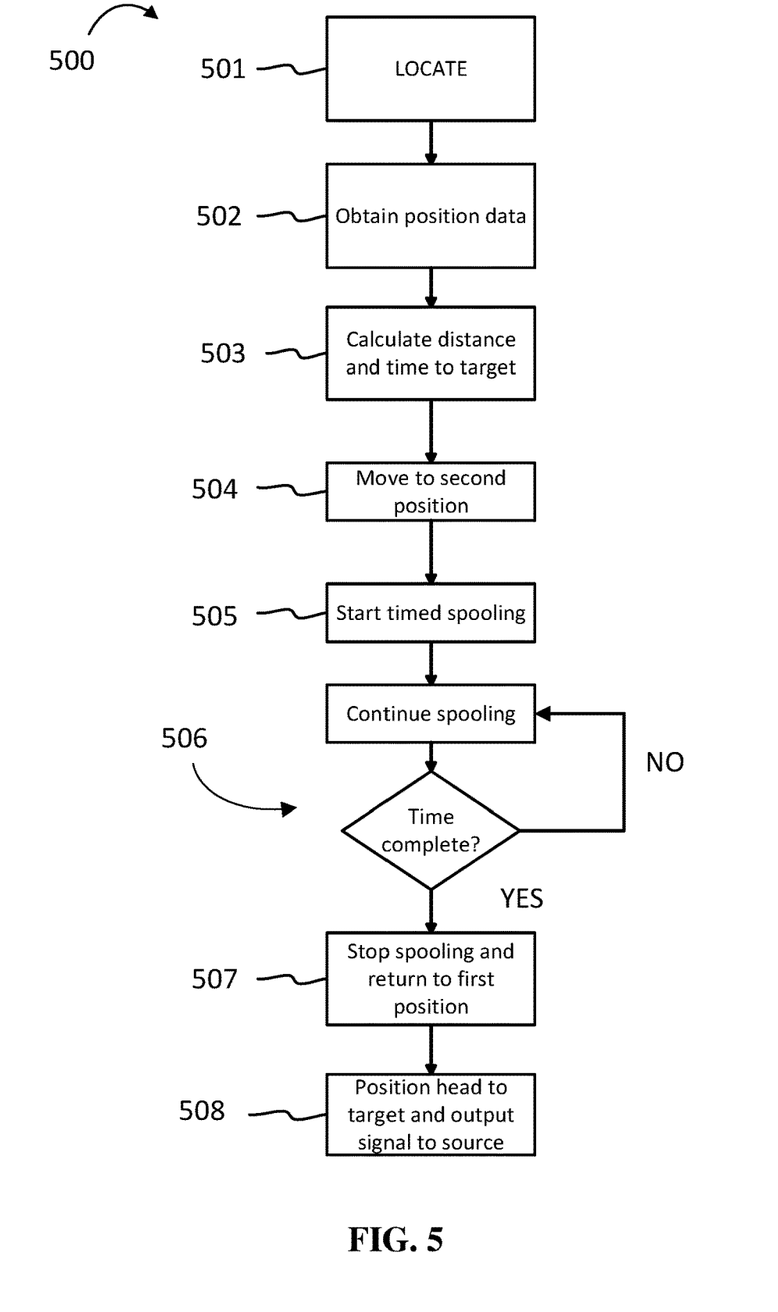
FIG. 5 depicts a calculated position method of adjusting a tape drive, in accordance with embodiments.

FIGS. 4 and 5 illustrate method embodiments for adjusting the tape drive between the first configuration and the second configuration based on a longitudinal position of the tape. Both methods can adjust the relative position of the head and the tape, however, the "absolute position method" 400, shown in FIG. 4, uses an indicia detection device to determine the longitudinal position of the tape, whereas the "calculated position method" 500, shown in FIG. 5, can perform a calculation to determine the longitudinal position of the tape. The calculated position method 500 may be beneficial, for example, in embodiments in which it is impossible or impractical to include a discrete indicia detection device in the tape drive.

FIG. 4 illustrates an embodiment of the absolute position method 400 of adjusting the tape drive according to the present invention. In the absolute position method 400, a controller uses an indicia detection device to monitor the longitudinal position of the tape as the tape is spooled to the target position. More specifically, in the absolute position method 400, the controller uses the indicia detection device to determine when to return the adjusting arm to the first position from the second position after spooling has been initiated.

Method 400 begins with the tape drive receiving a LOCATE command 401 from a source, such as a host computer, to spool to a target position of the tape. For example, a host computer may request data from a controller external to the tape drive, which commands the tape drive to locate a target position.

Next, at 402, the controller obtains data regarding a present longitudinal position along the length of the tape. For example, the controller may command an indicia detection device to detect a tape-position indicium and to provide a corresponding output indicating a longitudinal position, or the controller may command a tape head to read the longitudinal position from magnetic field patterns in the tape. Then the controller may store that output as a present longitudinal position.

Next, at 403, the controller commands the adjusting device to transition the adjusting arm into the second position. When the adjusting arm is in the second position, which corresponds to the second configuration of the tape drive, there is reduced physical contact between the head and the tape (i.e. the magnitude of the contact force between the head and the tape is lower in the second configuration than it is in the first configuration). For example, in the second configuration of some embodiments, an adjusting arm displaces the tape to a predetermined distance from the head, such that there is no physical contact between the head and the tape. In the second configuration of other embodiments, an adjusting arm displaces the head to a predetermined distance from the tape, such that the head and the tape make physical contact, but with a reduced contact force between the head and the tape. In the second configuration of other embodiments, an adjusting arm displaces the tape to a predetermined distance from the head, such that the head and the tape make physical contact, but with a reduced contact force between the head and the tape. Additionally at 403, the tape reel motor starts spooling. The start of spooling may be based on, for example, an output from the controller, the adjusting device, or a source, such as a host computer.

At 404, the indicia detection device detects the tape-position indicia as the tape spools. The detecting by the indicia detection device may be carried out continuously or intermittently. Additionally, the indicia detection device may provide an output corresponding to each detected indicium, or it may provide an output corresponding to at least one predetermined indicium. The output may be provided to, for example, the controller, the adjusting device, or a source, such as a host computer. Alternatively, the indicia detection device may store for comparison a value corresponding to at least one detected indicium.

At 405, a determination is made as to whether an indicium corresponding to the target position has been detected by the indicia detection device. The indicium corresponding to the target position may be an indicium at the target position or an indicium that is located a predetermined distance from the target position. For example, the controller may compare an output provided by the detection device to a stored value representing the target position and based on the comparison, determine whether the target position has been detected. Alternatively, the detection device may perform the determination. For example, the detection device may compare a value corresponding to a detected indicium to a stored value representing the target position, determine whether the target position has been detected based on the comparison, and then output the result of the determination to the controller.

Next, after an indicium corresponding to the target position has been detected, at 406, the controller commands the adjusting device to return the adjusting arm to the first position, in which the tape makes physical contact with the head. Additionally at 406, the tape reel motor stops spooling. The stopping of spooling may be based on, for example, an output from a timer, the controller, the adjusting device, or a source, such as a host computer.

Finally, at 407, the head is positioned to the target position of the tape, and the source, such as a host computer, receives an indication that the target position has been reached. For example, the controller may command the tape reel motor to move the tape until the head reads a position indicium at the target position, and afterward, the controller may send a corresponding signal to a host computer.

Other embodiments of the present invention may implement an alternate method, such as a calculated position method, to adjust the tape drive. The calculated position method permits the controller to determine when to stop spooling the tape while using the head as a sole indicia detection device. Thus, using the calculated position method, embodiments of the present invention may achieve reduced frictional contact between the head and the tape without the need for an indicia detection device other than the head. Nonetheless, embodiments of the present invention may implement the calculated position method using at least one indicia detection device in addition to the head or instead of the head.

FIG. 5 illustrates an embodiment of a calculated position method of adjusting the tape drive according to the present invention. In the calculated position method, the tape drive's controller may perform a calculation to determine when to stop spooling the tape and return the tape drive to a first configuration. More specifically, the tape drive's controller may calculate the time required to spool to the target position based on: 1) a distance from a present longitudinal position of the tape to the target position and 2) a rotating speed of the tape reel motor. Then the controller may command the tape to be spooled for the calculated time before it returns the adjusting arm to the first position.

Method 500 begins with the tape drive receiving a LOCATE command 501 from a source, such as a host computer, to spool to a target position of the tape. For example, a host computer may command a controller internal to the tape drive to locate a target position.

Next, at 502, the controller obtains data regarding a present longitudinal position along the length of the tape. For example, the controller may command the head to detect at least one tape-position indicium within a servo band and to provide a corresponding output indicating a longitudinal position. Alternatively, the controller may command an indicia detection device to detect a tape-position indicium and to provide a corresponding output indicating a longitudinal position. Then the controller may store the output as a present longitudinal position.

Next, at 503, the longitudinal distance along the tape between the present longitudinal position of the tape and the target position is calculated. The calculation may be based on a correlation between the tape-position indicia and a longitudinal distance along the tape, such as a known distance between each tape-position indicium along the tape. Then the time required to spool the tape to the target position is calculated using the determined distance and a predetermined rotating speed of the tape reel motor. The predetermined rotating speed may be selected from a range of speeds to achieve, for example, a minimum spooling time. The calculations and selection of a rotating speed may be performed by the controller, the detecting device, the indicia detection device, or a source, such as a host computer.

Next, at 504, the controller commands the adjusting device to transition the adjusting arm into the second position. When the adjusting arm is in the second position, which corresponds to the second configuration of the tape drive, there is reduced physical contact between the head and the tape (i.e. the magnitude of the contact force between the head and the tape is lower in the second configuration than it is in the first configuration). For example, in the second configuration of some embodiments, an adjusting arm displaces the head to a predetermined distance from the tape, such that there is no physical contact between the head and the tape. In the second configuration of other embodiments, an adjusting arm displaces the tape to a predetermined distance from the head, such that the head and the tape make physical contact, but with a reduced contact force between the head and the tape.

Next, at 505, the tape reel motor to starts spooling at the predetermined rotating speed for a designated time that is based on the calculated time. For example, the designated time may be approximately 95 percent of the calculated time to facilitate accurate positioning of the tape after it has been spooled. The start of spooling may be based on, for example, an output from the controller, the adjusting device, or a source, such as a host computer.

At 506, a determination whether the tape has been spooled for the designated time is made by, for example, the controller, the adjusting device, a timer, or a source, such as a host computer. An output corresponding to the determination may be sent to the controller.

Next, after the tape has been spooled for the designated time, at 507, the controller commands the adjusting device to return the adjusting arm to the first position, in which the tape makes physical contact with the head. Additionally at 507, the tape reel motor stops spooling. The stopping of spooling may be based on, for example, an output from a timer, the controller, the adjusting device, or a source, such as a host computer. The stopping of spooling may also be based on an indicia detection device detecting an indicium corresponding to the target position.

Finally, at 508, the head is positioned to the target position of the tape, and the source, such as a host computer, receives an indication that the target position has been reached. For example, a controller external to the tape drive may command the tape reel motor to move the tape until the head reads a position indicium at the target position, and afterward, the controller may send a corresponding signal to a host computer.

Figure 6:
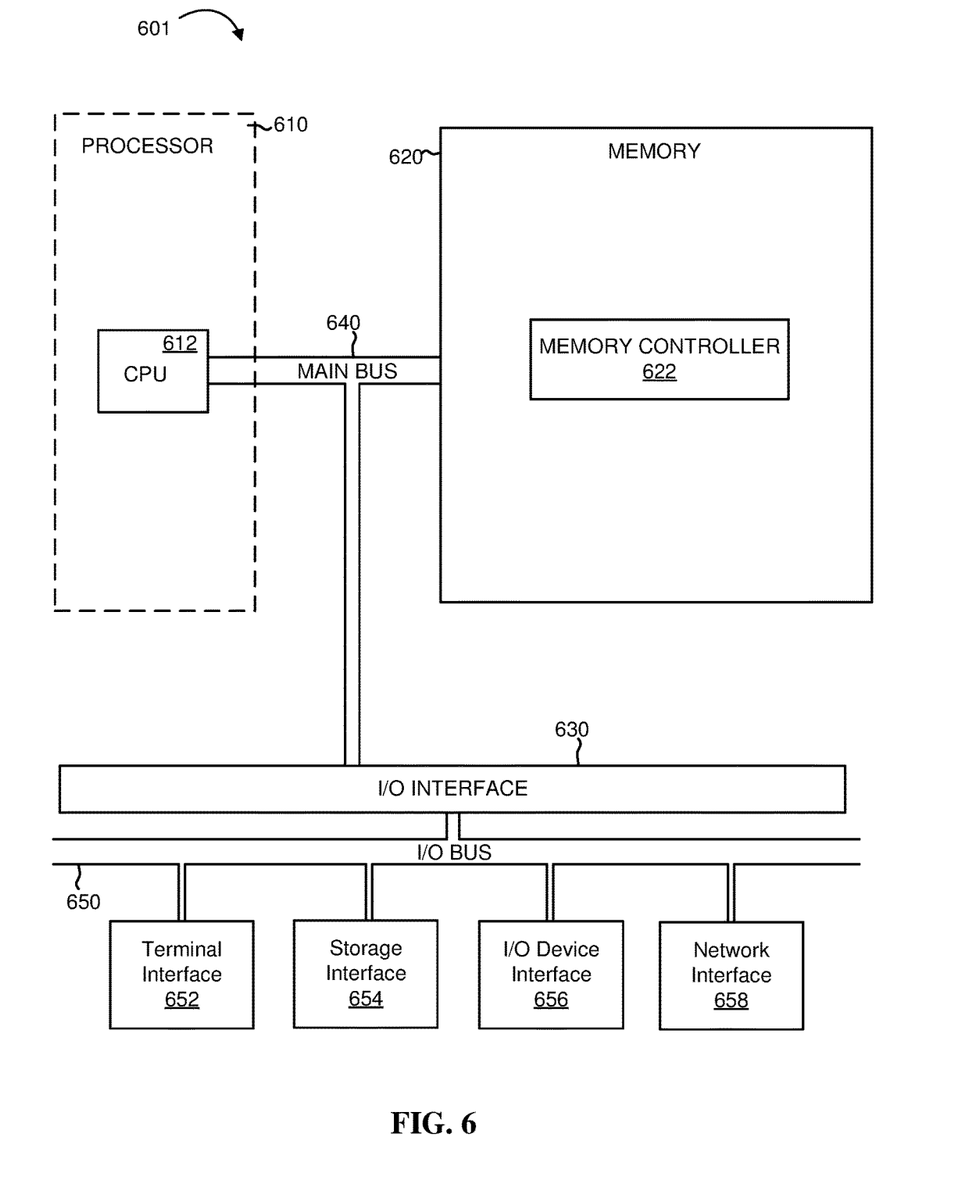
FIG. 6 depicts the representative major components of a computer system that may be used in accordance with embodiments.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A media device comprising:
a controller,
a tape head,
a tape comprising tape-position indicia,
an indicia detection device, and
an adjusting device;
wherein the indicia detection device is configured to detect the tape-position indicia and provide an output corresponding to a tape position;
wherein the controller is configured to send an adjustment command based on the output;
wherein the adjusting device is configured to adjust the media device between a first configuration and a second configuration, based on the adjustment command;
wherein the tape physically contacts the tape head in the first configuration; and
wherein the tape does not physically contact the tape head in the second configuration.

2. The media device of claim 1, wherein the adjusting device comprises an adjusting arm, and
wherein in the second configuration, the adjusting arm displaces the tape head a predetermined distance away from the tape.

3. The media device of claim 1, wherein the adjusting device comprises an adjusting arm, and
wherein in the second configuration, the adjusting arm displaces the tape a predetermined distance away from the tape head.

4. A method for adjusting a media device comprising:
detecting a tape-position indicium of a media device tape,
in response to the detecting, determining a present longitudinal position along the length of the tape;
adjusting the media device between a first configuration and a second configuration;
wherein in the first configuration, the tape physically contacts a tape head of the media device;
wherein in the second configuration, a contact force between the tape and the tape head is reduced;
spooling the tape;
stopping the spooling based on determining that a target position has been reached; and
returning the media device to the first configuration from the second configuration.

5. The method of claim 4, wherein adjusting the media device comprises displacing the tape head a predetermined distance away from the tape.

6. The method of claim 4, wherein adjusting the media device comprises displacing the tape a predetermined distance away from the tape head.

7. The method of claim 4, wherein the determining that the target position has been reached comprises detecting a tape-position indicium corresponding to the target position of the tape.

8. The method of claim 4, wherein the determining that the target position has been reached comprises determining that the tape has been spooled for a designated time.

9. The method of claim 8, wherein the determining that the target position has been reached further comprises detecting a tape-position indicium corresponding to the target position of the tape.

10. The method of claim 4, further comprising calculating the longitudinal distance between the present longitudinal position of the tape and the target position of the tape.

11. The method of claim 4, further comprising calculating the time required to spool the tape from the present longitudinal position of the tape to the target position of the tape.

12. The method of claim 4, wherein in second configuration, the tape does not physically contact the tape head.

13. A computer program product for adjusting a media device, the computer program product comprising a computer readable storage medium having program instructions embodied therewith, the program instructions executable by a computer to cause the computer to:
detect a tape-position indicium of a media device tape,
in response to the detecting, determine a present longitudinal position along the length of the tape;
adjust the media device between a first configuration and a second configuration;
wherein in the first configuration, the tape physically contacts a tape head of the media device;
wherein in the second configuration, a contact force between the tape and the tape head is reduced;
spool the tape;
stop spooling the tape based on determining that a target position has been reached; and
return the media device to the first configuration from the second configuration.

14. The computer program product of claim 13, wherein adjusting the media device comprises displacing the tape head a predetermined distance away from the tape.

15. The computer program product of claim 13, wherein adjusting the media device comprises displacing the tape a predetermined distance away from the tape head.

16. The computer program product of claim 13, wherein the determining that the target position has been reached comprises detecting a tape-position indicium corresponding to the target position of the tape.

17. The computer program product of claim 13, wherein the determining that the target position has been reached comprises determining that the tape has been spooled for a designated time.

18. The computer program product of claim 17, wherein the determining that the target position has been reached further comprises detecting a tape-position indicium corresponding to the target position of the tape.

19. The computer program product of claim 13, wherein the instructions further cause the computer to:
- calculate the longitudinal distance between the present longitudinal position of the tape and the target position of the tape; and
- calculate the time required to spool the tape from the present longitudinal position of the tape to the target position of the tape.

20. The computer program product of claim 13, wherein in second configuration, the tape does not physically contact the tape head.

* * * * *